United States Patent
Ishi

(10) Patent No.: US 9,889,511 B2
(45) Date of Patent: Feb. 13, 2018

(54) CUTTING INSERT, CUTTING TOOL, AND METHOD OF PRODUCING MACHINED PRODUCT USING THE SAME

(71) Applicant: Kyocera Corporation, Kyoto-shi, Kyoto (JP)

(72) Inventor: Hirohisa Ishi, Kyoto (JP)

(73) Assignee: Kyocera Corporation, Kyoto-Shi, Kyoto (JP)

( * ) Notice: Subject to any disclaimer, the term of this patent is extended or adjusted under 35 U.S.C. 154(b) by 0 days.

(21) Appl. No.: 15/443,111

(22) Filed: Feb. 27, 2017

(65) Prior Publication Data

US 2017/0252838 A1 Sep. 7, 2017

Related U.S. Application Data

(63) Continuation of application No. 14/993,501, filed on Jan. 12, 2016, now Pat. No. 9,604,292, which is a (Continued)

(30) Foreign Application Priority Data

Oct. 31, 2011 (JP) ................................ 2011-239491

(51) Int. Cl.
  *B23C 5/20* (2006.01)
  *B23C 5/06* (2006.01)
  *B23C 5/10* (2006.01)

(52) U.S. Cl.
  CPC ............... *B23C 5/207* (2013.01); *B23C 5/06* (2013.01); *B23C 5/109* (2013.01); (Continued)

(58) Field of Classification Search
  CPC ........... B23C 5/207; B23C 5/06; B23C 5/109; B23C 2200/0494; B23C 2200/085; (Continued)

(56) References Cited

U.S. PATENT DOCUMENTS

| | | |
|---|---|---|
| 5,810,521 A | 9/1998 | Pantzar et al. |
| 5,904,449 A | 5/1999 | Satran et al. |

(Continued)

FOREIGN PATENT DOCUMENTS

| | | |
|---|---|---|
| EP | 2 703 108 A1 | 3/2014 |
| EP | 2 727 672 A1 | 5/2014 |

(Continued)

OTHER PUBLICATIONS

Japanese Office Action with English concise explanation, Japanese Patent Application No. 2015-200722, dated Aug. 24, 2016, 9 pgs.

(Continued)

*Primary Examiner* — Omar Flores Sanchez
(74) *Attorney, Agent, or Firm* — Volpe and Koenig, P.C.

(57) ABSTRACT

A cutting insert comprises a first surface sequentially including a first and second inclined surface. The first inclined surface is inclined toward the second surface, going inward from the edge at a first inclined angle on a basis of a perpendicular plane perpendicular to a central axis extending between the first surface and a second surface. The second inclined surface, located more inward than the first inclined surface, is inclined toward the second surface at a second inclined angle different from the first inclined angle on the basis of the perpendicular plane. An intersecting part of the first inclined surface and the second inclined surface includes a first part located at a highest position in a region of the intersecting part along the second side surface. A cutting tool with the cutting insert, and a method of producing a machined product using the cutting tool are provided.

20 Claims, 12 Drawing Sheets

Related U.S. Application Data continuation of application No. 14/354,775, filed as application No. PCT/JP2012/072037 on Aug. 30, 2012, now Pat. No. 9,272,342.

(52) U.S. Cl.
CPC ............... *B23C 2200/0494* (2013.01); *B23C 2200/085* (2013.01); *B23C 2200/125* (2013.01); *B23C 2210/045* (2013.01); *B23C 2210/0457* (2013.01); *Y10T 83/04* (2015.04); *Y10T 407/22* (2015.01); *Y10T 407/23* (2015.01)

(58) Field of Classification Search
CPC ........ B23C 2200/125; B23C 2210/045; B23C 2210/0457; Y10T 407/22; Y10T 407/23; Y10T 83/04
USPC ................. 83/13; 407/116, 113, 49
See application file for complete search history.

(56) References Cited

U.S. PATENT DOCUMENTS

| | | | | |
|---|---|---|---|---|
| 7,232,279 | B2* | 6/2007 | Smilovici | B23C 5/2221 407/113 |
| 8,834,075 | B2* | 9/2014 | Choi | B23C 5/08 407/113 |
| 8,926,234 | B2* | 1/2015 | Engstrom | B23C 5/202 407/113 |
| 8,997,610 | B2* | 4/2015 | Ishida | B23C 5/06 407/113 |
| 2003/0170079 | A1 | 9/2003 | Daiguji et al. | |
| 2004/0208714 | A1 | 10/2004 | Stabel et al. | |
| 2006/0045636 | A1 | 3/2006 | Johnson et al. | |
| 2006/0257214 | A1 | 11/2006 | Johnson et al. | |
| 2012/0177452 | A1 | 7/2012 | Konta | |
| 2012/0189396 | A1 | 7/2012 | Xu | |
| 2016/0082528 | A1* | 3/2016 | Ballas | B23C 5/207 407/48 |
| 2016/0303665 | A1* | 10/2016 | Hecht | B23C 5/06 |
| 2017/0189972 | A1* | 7/2017 | Matsumura | B23C 5/207 |
| 2017/0189975 | A1* | 7/2017 | Yamamoto | B23C 5/207 |
| 2017/0197259 | A1* | 7/2017 | Kumoi | B23C 5/207 |

FOREIGN PATENT DOCUMENTS

| | | |
|---|---|---|
| JP | 08-505817 A | 6/1996 |
| JP | 8-243831 | 9/1996 |
| JP | 3046268 U | 12/1997 |
| JP | 10-146712 A | 6/1998 |
| JP | 2001-047306 A | 2/2001 |
| JP | 2003-334716 A | 11/2003 |
| JP | 2004-314301 A | 11/2004 |
| JP | 2008-511464 A | 4/2008 |
| JP | 2010-524709 | 7/2010 |
| JP | 2011-093043 A | 5/2011 |
| WO | 2008/132757 A1 | 11/2008 |
| WO | 2011/046045 A1 | 4/2011 |
| WO | 2011/052340 A1 | 5/2011 |
| WO | 2011/086544 A1 | 7/2011 |

OTHER PUBLICATIONS

Extended European Search Report, European Patent Application No. 12845789.2, dated Jul. 7, 2015, 7 pgs.
International Search Report, PCT/JP2012/072037, dated Nov. 27, 2012, 2 pgs.
Japanese Office Action with English concise explanation, Japanese Patent Application No. 2013-541663, dated Mar. 3, 2015, 4 pgs.

\* cited by examiner

CUTTING INSERT, CUTTING TOOL, AND METHOD OF PRODUCING MACHINED PRODUCT USING THE SAME

TECHNICAL FIELD

The present invention relates to a cutting insert, a cutting tool, and a method of producing a machined product using the same.

BACKGROUND ART

Conventionally, a configuration in which a rake surface, a step part, and a seating surface are sequentially located inwardly from a corner cutting edge has been proposed as a cutting plate for use in a face milling process (for example, refer to Japanese Unexamined Patent Publication No. 2004-314301).

However, when the cutting plate of Japanese Unexamined Patent Publication No. 2004-314301 is used, for example, under cutting conditions that the depth of cut is small, such as in the case of finish cut, there is a risk that chips extending without being curled and divided may damage a machined surface of a workpiece.

Hence, there is a need for an insert with excellent chip discharge performance in order to suppress quality deterioration of the machined surface of the workpiece due to the chips as described above.

SUMMARY OF THE INVENTION

An object of the present invention is to provide a cutting insert and a cutting tool each having the excellent chip discharge performance, as well as a method of producing a machined product using the cutting insert and the cutting tool.

A cutting insert according to an embodiment of the present invention includes an upper surface, a lower surface, a side surface that is connected to each of the upper surface and the lower surface, and sequentially includes a first side surface, a corner side surface, and a second side surface, and a cutting edge. The cutting edge includes a major cutting edge located at an intersecting part of the upper surface and the first side surface, a corner cutting edge located at an intersecting part of the upper surface and the corner side surface, and a minor cutting edge located at an intersecting part of the upper surface and the second side surface. The upper surface sequentially includes a first rake surface and a second rake surface. The first rake surface is located along the cutting edge and is inclined toward the lower surface as going inward from the cutting edge at a first rake angle on a basis of a perpendicular plane perpendicular to a central axis extending between the upper surface and the lower surface. The second rake surface is located more inward than the first rake surface and is inclined toward the lower surface at a second rake angle different from the first rake angle on the basis of the perpendicular plane. An intersecting part of the first rake surface and the second rake surface includes a protruded part located at a highest position in a region of the intersecting part extending along the second side surface.

A cutting tool according to an embodiment of the present invention includes the cutting insert of the foregoing embodiment, and a holder configured to attach the cutting insert to the holder.

A method of producing a machined product according to an embodiment of the present invention includes rotating the cutting tool according to the foregoing embodiment, bringing the cutting edge of the cutting tool being rotated into contact with a workpiece, and separating the cutting tool from the workpiece.

With the cutting insert according to the embodiment of the present invention, the upper surface sequentially includes the first rake surface and the second rake surface. The first rake surface is located along the cutting edge and is inclined toward the lower surface as going inward from the cutting edge at the first rake angle on the basis of the perpendicular plane perpendicular to the central axis extending between the upper surface and the lower surface. The second rake surface is located more inward than the first rake surface and is inclined toward the lower surface at the second rake angle different from the first rake angle on the basis of the perpendicular plane. The intersecting part of the first rake surface and the second rake surface includes the protruded part located at the highest position in the region of the intersecting part extending along the second side surface. Therefore, even under the cutting conditions that the corner cutting edge and the minor cutting edge are used mainly and the depth of cut is relatively small, generated chips can be stably curled by the high protruded part located in the region of the intersecting part extending along the second side surface, thereby exhibiting the excellent chip discharge performance.

BRIEF DESCRIPTION OF THE DRAWINGS

FIG. 1(*c*) is a side view taken in the direction of arrow X1 in FIG. 1(*b*) (illustrating a second side surface), FIG. 1(*d*) is a side view taken in the direction of arrow X2 in FIG. 1(*b*) (illustrating a first side surface);

PREFERRED EMBODIMENTS FOR CARRYING OUT THE INVENTION

<Cutting Insert>

Figure 1A:
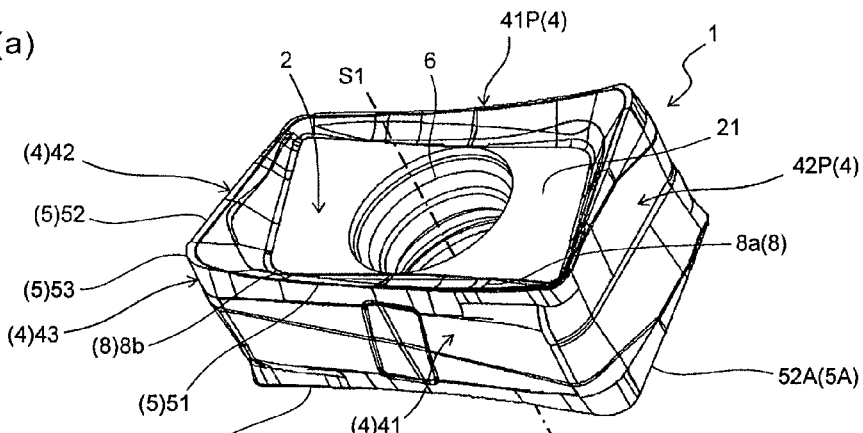
FIG. 1(*a*) is a perspective view of a cutting insert according to an embodiment of the present invention, FIG. 1(*b*) is a plan view (top view) thereof.

A cutting insert (hereinafter generally referred to as an "insert") according to an embodiment of the present invention is described in detail below with reference to FIGS. 1 to 7.

As shown in FIG. 1, the insert 1 of the present embodiment generally includes an upper surface 2, a lower surface 3, a side surface 4 connected to each of the upper surface 2 and the lower surface 3, a through hole 6 extending between the upper surface 2 and the lower surface 3, and a cutting edge 5 located at an intersecting part of the upper surface 2 and the side surface 4. The upper surface 2 includes a rake surface 8 and a flat surface 21. The side surface 4 includes a first side surface 41, a corner side surface 43, and a second side surface 42. The cutting edge 5 includes a major cutting edge 51, a corner cutting edge 53, and a minor cutting edge 52. The individual components of the insert 1 are sequentially described below.

Figure 1B:
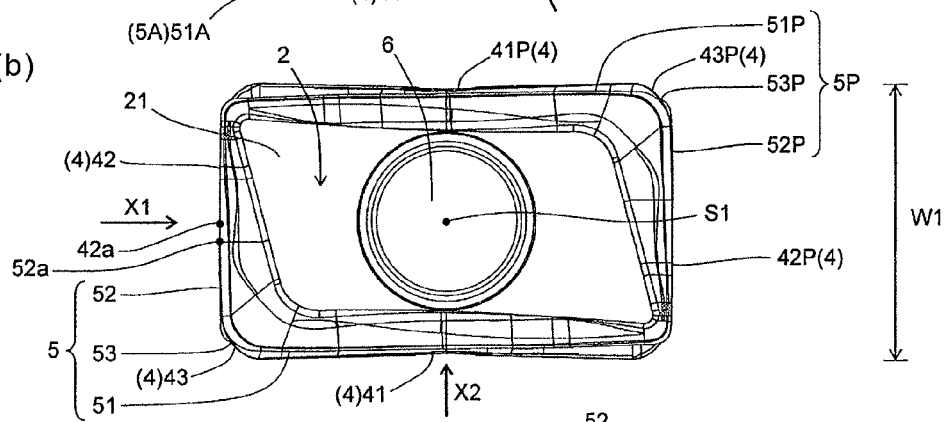

As shown in FIG. 1(b), the insert 1 has an approximately quadrangular shape (approximately rectangular shape) in a top view. Unless otherwise stated below, the term "top view" denotes a condition in which the insert 1 is viewed from the upper surface 2. The shape of the insert 1 is not limited to the approximately quadrangular shape. The insert 1 may have a plate shape of an approximately polygonal shape, such as triangle, pentagon, hexagon, and octagon, in the top view.

For example, the insert 1 may be configured so that each long side of the approximately quadrangular shape measures approximately 8-15 mm and each short side thereof measures approximately 4-8 mm in the top view. A thickness from the upper surface 2 to the lower surface 3 may be approximately 3-7 mm. The term "thickness" denotes a line segment parallel to a central axis S1 of the insert 1 in a distance from a portion of the upper surface 2 that is located uppermost to a portion of the lower surface 3 that is located lowermost in a side view. Unless otherwise stated below, the term "side view" denotes a condition in which the insert 1 is viewed toward the first side surface 41. The term "central axis S1 of the insert 1" denotes the axis that extends between the upper surface 2 and the lower surface 3, and serves as a rotation axis when the insert 1 is rotated in the top view.

Similarly to the case of the upper surface 2, as shown in FIG. 1(a), the insert 1 also includes a cutting edge 5A having a major cutting edge 51A and a minor cutting edge 52A, at an intersecting part of the lower surface 3 and the side surface 4. When a cutting process is performed using the major cutting edge 51A close to the lower surface 3, the flat surface 21 of the upper surface 2 is usable as a seating surface to a holder 10 described later. That is, with the insert 1 of the present embodiment, the upper surface 2 and the lower surface 3 are individually usable for the cutting process. Therefore, in order to ensure the use of the insert 1 in a vertically inverted state, the major cutting edge 51A close to the lower surface 3 has a shape obtained by inverting the major cutting edge 51 close to the upper surface 2.

Figure 1C:
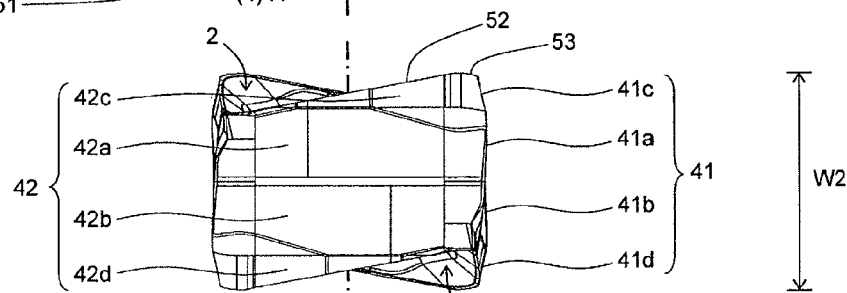

That is, the insert 1 has rotational symmetry around a line normal to the paper surface of FIG. 1(c). Hence, with the insert 1 of the present embodiment, the cutting process is performable using a total of four corners, namely, two on each of the upper surface 2 and the lower surface 3. Thus, a portion of the side surface 4 configured to dispose the major cutting edge 51 and a portion of the side surface 4 configured to dispose the minor cutting edge 52 are respectively independently configured as the first side surface 41 and the second side surface 42. This configuration makes it relatively easy to design a suitable configuration for the major cutting edge 51 and the rake surface 8 located on the upper surface 2 along the major cutting edge 51, and a suitable configuration for a flank surface (a second upper constraining surface 42a) with respect to the minor cutting edge 52. The individual components of the insert 1 according to the present embodiment are described in further detail below.

(Cutting Edges)

The cutting edge 5 is the located at the intersecting part of the upper surface 2 and the side surface 4, and includes the major cutting edge 51 and the minor cutting edge 52. In the present embodiment, the major cutting edge 51 and the minor cutting edge 52 are connected to each other with the corner cutting edge 53 interposed therebetween as shown in FIG. 1(b). The insert 1 of the present embodiment is capable of performing the cutting process by using a corner including the major cutting edge 51, the minor cutting edge 52, and the corner cutting edge 53.

Figure 1D:
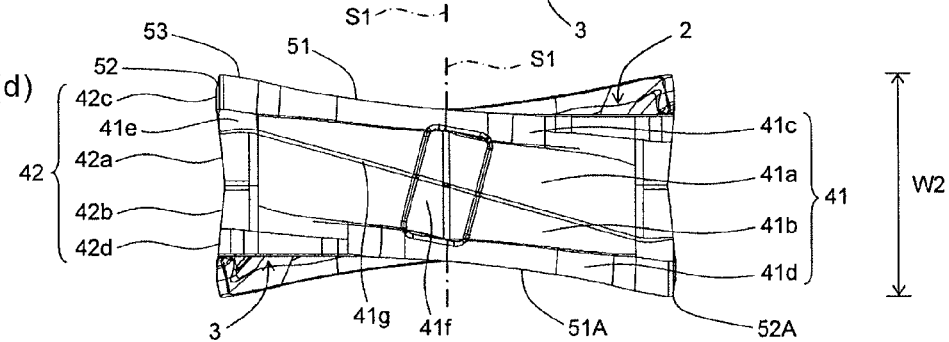

The major cutting edge 51 is located at an intersecting part of the upper surface 2 and the first side surface 41, and functions mainly to generate chips in a cutting action. As shown in FIG. 1(b), the major cutting edge 51 has a gentle convex-shaped curve line in an outward direction as going away from the minor cutting edge 52 in the top view. As shown in FIG. 1(d), the major cutting edge 51 is inclined downward as going away from the minor cutting edge 52 in the side view. The former structure ensures reduction of cutting edge fracture of the major cutting edge 51, and the latter structure ensures reduction of cutting resistance during the cutting process. An inclination angle of the major cutting edge 51 in the side view is gradually decreased as going away from the minor cutting edge 52. The inclination angle of the major cutting edge 51 in the side view may reach zero at the end portion of the major cutting edge 51 that is farthest from the minor cutting edge 52.

The minor cutting edge 52 is located at an intersecting part of the upper surface 2 and the second side surface 42, and functions to smoothen a finished surface 102 of a workpiece 100 described later. In the present embodiment, it is preferable to use mainly, during the cutting process, a region of the intersecting part of the upper surface 2 and the second side surface 42. The region extends from an end portion of the intersecting part close to the major cutting edge 51 (corner cutting edge 53) to a middle portion of the intersecting part.

In the present embodiment, the minor cutting edge 52 has a straight line shape in the top view as shown in FIG. 1(b). The minor cutting edge 52 is inclined toward the lower surface 3 as going away from the corner cutting edge 53 in the side view taken from the second side surface 42 as shown in FIG. 1(c). More specifically, the minor cutting edge 52 is inclined downward in the straight line shape as going from one end of the minor cutting edge 52 close to the major cutting edge 51 (corner cutting edge 53) to the other end spaced away from the major cutting edge 51 (corner cutting edge 53) in the side view taken from the second side surface 42. An inclination angle of the minor cutting edge 52 is preferably set to 6° to 13° on a basis of a plane perpendicular to the central axis S1 in the side view taken from the second side surface 42. The portion close to the one end functions mainly to smoothen the finished surface 102 of the workpiece 100.

Thus, the minor cutting edge 52 is formed of the single straight line so as to eliminate a projected portion, such as a highest point, in the direction from one end to the other end. This configuration reduces the probability that when the chips generated during the cutting process using the cutting edges 51 to 53 close to the one corner side surface 43 are discharged through the upper surface 2 (rake surface 8), the chips collide with the minor cutting edge 52P among the major cutting edge 51P, the corner cutting edge 53P, and the minor cutting edge 52P close to another corner side surface 43P described later. It is therefore ensured to reduce damage to the non-used minor cutting edge 52P. In another embodiment, the minor cutting edge 52 may have a gentle circular arc shape in the side view taken from the second side surface 42.

As shown in FIG. 1(b), the corner cutting edge 53 is located at an intersecting part of the upper surface 2 and a corner side surface 43, and functions to reduce fracture of the cutting edge at an intersecting part of the major cutting edge 51 and the minor cutting edge 52. In the present embodiment, the corner cutting edge 53 is disposed between the major cutting edge 51 and the minor cutting edge 52, and has a relatively gentle curved line shape.

(Upper Surface)

As shown in FIG. 1(a), the upper surface 2 includes a rake surface 8 and a flat surface 21. The rake surface 8 is located along the cutting edge 5 and is inclined downward as going away from the cutting edge 5. The flat surface 21 is located at a portion that lies on the circumference of the through hole 6 and is spaced apart from the cutting edge 5. The flat surface 21 is at least partially located above the major cutting edge 51.

The rake surface 8 is to be contacted with the chips generated by the major cutting edge 51 during the cutting process so as to deform the chips or change a chip flow direction, thus allowing the chips to be smoothly discharged outside. The rake surface 8 may include a planar surface shape portion or curved surface shape portion. The term "planar surface shape" includes not only a strict planar surface but also ones having somewhat irregularities and curvature as long as the rake surface 8 can perform the above-mentioned function. This is also true for the case of having the curved surface shape.

The flat surface 21 functions as a seating surface when the insert 1 is attached to the holder 10.

In the present embodiment, as shown in FIGS. 6 and 7, the rake surface 8 sequentially includes a first rake surface 81 and a second rake surface 82. The first rake surface 81 is located along the cutting edge 5 and is inclined toward the lower surface 3 as going inward from the cutting edge 5 at a first rake angle $\theta 1$ on the basis of a perpendicular plane S1b perpendicular to the central axis S1 extending between the upper surface 2 and the lower surface 3. The second rake surface 82 is located more inward than the first rake surface 81 and is inclined toward the lower surface 3 at a second rake angle $\theta 2$ different from the first rake angle $\theta 1$ on the basis of the perpendicular plane S1b. An intersecting part 83 of the first rake surface 81 and the second rake surface 82 includes a protruded portion 831 located at the highest position in a region of the intersecting part 83 extending along the second side surface 42. With this configuration, the generated chips can be curled stably by the high protruded portion 831 located on the region along the second side surface 42 even under cutting conditions that the corner cutting edge 53 and the minor cutting edge 52 are used mainly and the depth of cut is relatively small. This configuration ensures the excellent chip discharge performance.

The term "inward" denotes being located inside the insert 1 with respect to the cutting edge 5 and being located close to the through hole 6 (the central axis S1). The term "highest position" denotes being large in terms of height on the basis of the perpendicular plane S1b, namely, in terms of distance in the direction of the central axis S1 of the insert 1. The second rake angle $\theta 2$ of the second rake surface 82 may be partially identical to the first rake angle $\theta 1$ of the first rake surface 81.

Figure 6A:
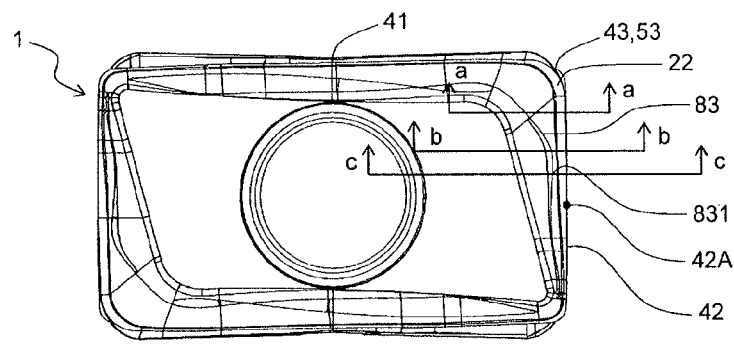
Figure 6B:
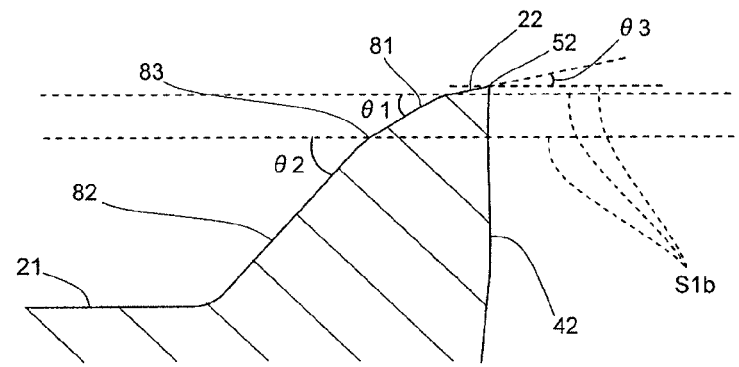
Figure 6C:
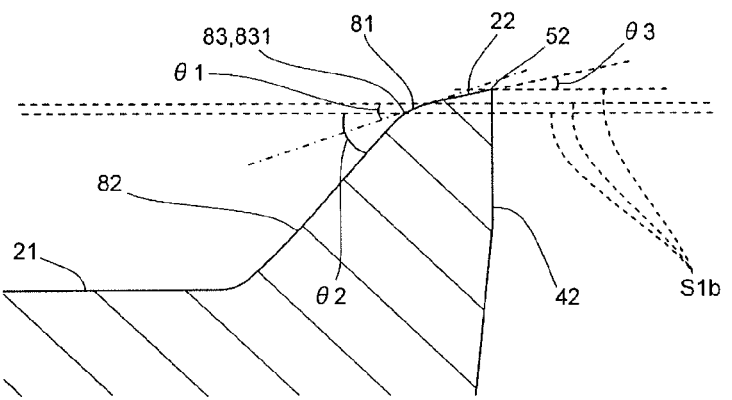
Figure 6D:
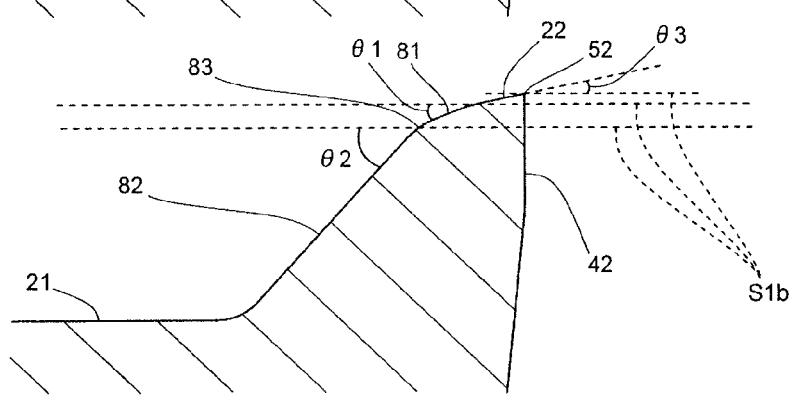
Figure 7A:
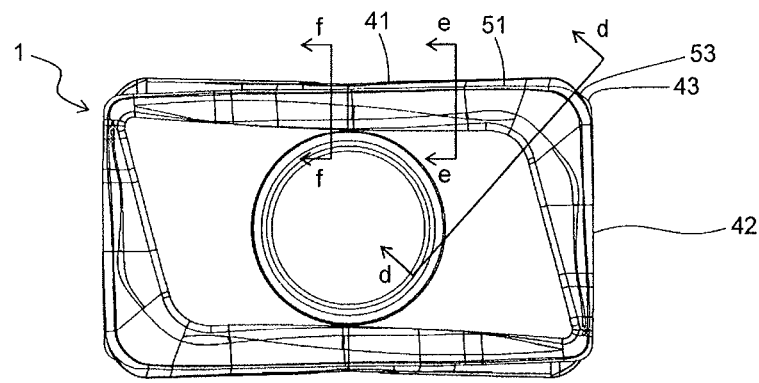
FIG. 7(*a*) is a plan view (top view) of the cutting insert of FIG. 1, FIG. 7(*b*) is a cross-sectional view taken along the line d-d of FIG. 7(*a*), FIG. 7(*c*) is a cross-sectional view taken along the line e-e of FIG. 7(*a*), and FIG. 7(*d*) is a cross-sectional view taken along the line f-f of FIG. 7(*a*)
Figure 7B:
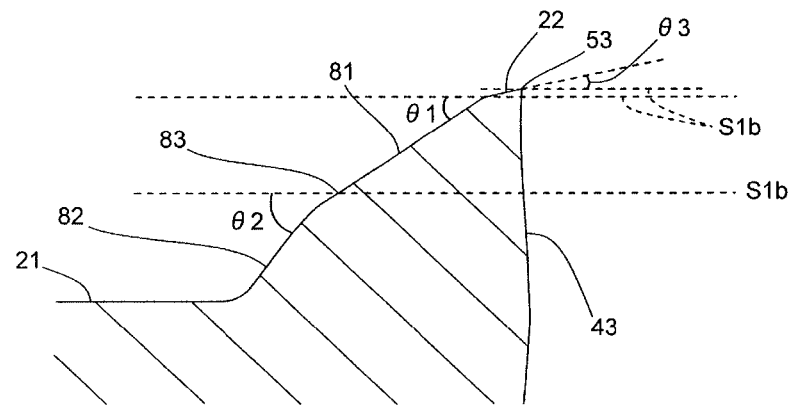
Figure 7C:
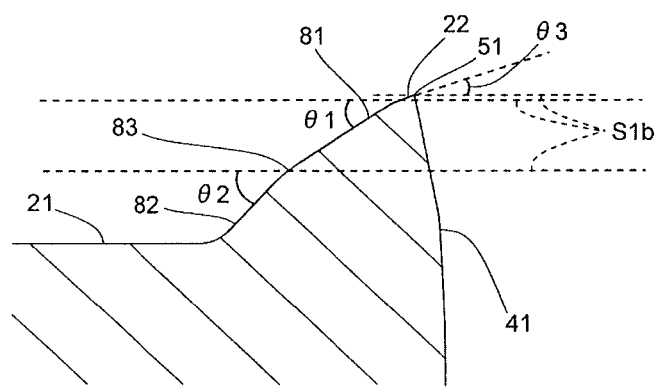
Figure 7D:
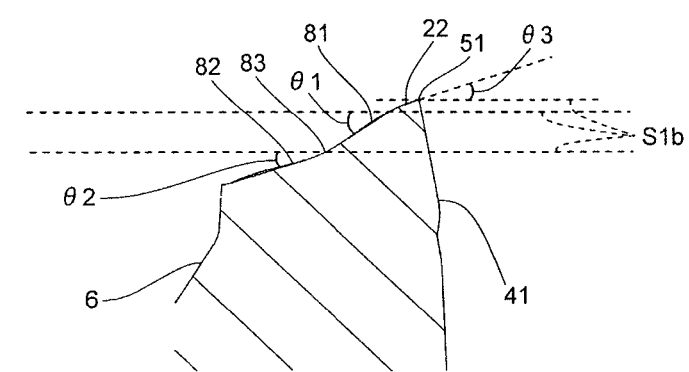

In the present embodiment, the protruded portion 831 is located closer to the corner side surface 43 than a midpoint 42A of the second side surface 42 in the top view as shown in FIGS. 6(a) and 6(c). This configuration ensures effective curling of the chips generated under the cutting conditions that the depth of cut is small as described above.

In the present embodiment, the first rake angle $\theta 1$ of the first rake surface 81 reaches a minimum at a portion thereof passing through the protruded portion 831 as shown in FIG. 6(c). This configuration makes it easier to create a difference in height between this portion and the portion located closer to the corner cutting edge 53 of the rake surface 8 particularly than the protruded portion 831.

In the present embodiment, the second rake angle $\theta 2$ of the second rake surface 82 is decreased as going from the corner cutting edge 53 to the major cutting edge 51 side as shown in FIG. 7. This configuration allows the second rake surface 82 to ensure a thickness on the first end portion 8a as shown in FIG. 1(a), thereby reducing damage to the major cutting edge 51 in a region subjected to a large depth of cut. The first end portion 8a corresponds to one of both end portions of the rake surface 8 located along the major cutting edge 51, which is located further away from the minor cutting edge 52. A later-described second end portion 8b is one of both end portions of the rake surface 8 located along the major cutting edge 51, which is located close to the minor cutting edge 52.

In the present embodiment, the first rake angle $\theta 1$ of the first rake surface 81 and the second rake angle $\theta 2$ of the second rake surface 82 include region in which a reversal of values occurs between the corner cutting edge 53 side and the major cutting edge 51 side as shown in FIG. 7. In the present embodiment, the angles $\theta 1$ and $\theta 2$ have a relationship of $\theta 1 < \theta 2$ in FIG. 7(b), a relationship of $\theta 1 < \theta 2$ in FIG. 7(c), and a relationship of $\theta 1 > \theta 2$ in FIG. 7(d). That is, the first rake angle $\theta 1$ and the second rake angle $\theta 2$ are subject to the reversal of values as going away from the corner cutting edge 53. This configuration ensures that the second rake surface 82 has a small inward-oriented width on the second end portion 8b in the top view, thereby ensuring a large area of the flat surface 21 so as to enhance attachment stability to the holder. This configuration also ensures a certain thickness on the first end portion 8a so as to reduce damage to the major cutting edge 51 in the region subjected to the large depth of cut. Alternatively, a relationship that the first rake angle θ1 is smaller than the second rake angle θ2 may be retained instead of the reversal of values between the above-mentioned portions.

In the present embodiment, the first rake angle θ1 of the first rake surface 81 is subject to less variation than the second rake angle θ2 of the second rake surface 82 in the region from the first side surface 41 to the corner side surface 43 as shown in FIG. 7.

The rake surface 8 may be continuous with the major cutting edge 51 or disposed with a so-called land surface (land part) interposed therebetween. The term "land surface" denotes a narrow belt-shaped surface with a constant width disposed along the cutting edge 5 on the upper surface 2. The land surface is disposed for the purpose of reducing fracture of the cutting edge 5. In the present embodiment, the upper surface 2 further includes the land surface 22 disposed between the cutting edge 5 and the first rake surface 81 as shown in FIGS. 6 and 7. The land surface 22 lies over the whole periphery of the insert 1.

The land surface 22 may be flat, or inclined as going inward from the cutting edge 5 in a direction toward the lower surface 3 or in a direction away from the lower surface 3 at a land angle θ3 on the basis of the perpendicular plane S1b. The land angle θ3 is determined as being plus (+) when the land surface 22 is inclined toward the lower surface 3, and as being minus (−) when the land surface 22 is inclined in the direction away from the lower surface 3, on the basis of the perpendicular plane S1b. In the present embodiment, the land surface 22 is inclined toward the lower surface 3 as going inward from the cutting edge 5 at the land angle θ3 on the basis of the perpendicular plane S1b. That is, in the present embodiment, the land angle θ3 is plus, and the land angle θ3 is smaller than the first rake angle θ1 of the first rake surface 81.

With the present embodiment, the upper surface 2 and the lower surface 3 have the same configuration, and hence the description of the lower surface 3 is omitted in the following unless a special description is needed.

(Through Hole)

The through hole 6 is the hole configured to insert a clamp screw and an attachment bolt when the insert 1 is attached to the holder 10. In the present embodiment, the through hole 6 is located in a central part of the upper surface 2, and the central axis of the through hole 6 and the central axis S1 of the insert 1 exist in the same position.

(Side Surface)

The side surface 4 is connected to each of the upper surface 2 and the lower surface 3 as described above. The side surface 4 includes a first side surface 41 and a second side surface 42 adjacent to each other. The first side surface 41 and the second side surface 42 respectively include a plurality of constraining surfaces described later. According to an attachment direction with respect to the holder 10, the individual constraining surfaces function as an attachment surface to the holder 10, or as a so-called flank surface for avoiding contact with the workpiece 100.

In the present embodiment, as shown in FIG. 1(b), the side surface 4 further includes a corner side surface 43 that is disposed between the first side surface 41 and the second side surface 42, and is curved outward in the top view. That is, the side surface 4 sequentially includes the first side surface 41, the corner side surface 43, and the second side surface 42.

The insert 1 of the present embodiment has the rectangular shape whose long sides correspond to an outer edge close to the first side surface 41 and short sides correspond to an outer edge close to the second side surface 42 in the top view. An end portion 52a of the minor cutting edge 52 spaced apart from the corner cutting edge 53 is located closer to the corner cutting edge 53 than a midpoint 42a of each of the short sides.

As described above, the insert 1 of the present embodiment has the rectangular shape whose long sides correspond to the outer edge close to the first side surface 41 and short sides correspond to the outer edge close to the second side surface 42 in the top view. Therefore, a third side surface 41P to be paired with the first side surface 41 is located on the opposite side, and a fourth side surface 42P to be paired with the second side surface 42 is located on the opposite side. The third side surface 41P and the fourth side surface 42P respectively have the same structure as the first side surface 41 and the second side surface 42. Therefore, the descriptions of the first side surface 41 and the second side surface 42 are applicable to the descriptions of the third side surface 41P and the fourth side surface 42P in the following unless a special description is needed. This is also true for another corner side surface 43P to be paired with the corner side surface 43.

In the insert 1 of the present embodiment, a distance (width) W1 from the first side surface 41 to the third side surface 41P in the top view shown in FIG. 1(b) is larger than a distance (thickness) W2 from the upper surface 2 to the lower surface 3 in the side view shown in FIGS. 1(c) and (d). That is, the insert 1 of the present embodiment is a so-called lateral insert. The insert 1 is to be attached to the holder 10 by using the clamp screw 61 to be inserted into the through hole 6 as described later. With this configuration, the insert 1 has a large width so as to ensure that the rake surface 8 has desired size and shape, thereby improving the chip discharge performance. Additionally, the clamp screw 61 is to be inserted into the through hole 6. This configuration eliminates the need to increase the thickness of the insert 1 than necessary, thus reducing material costs.

Figure 2A:
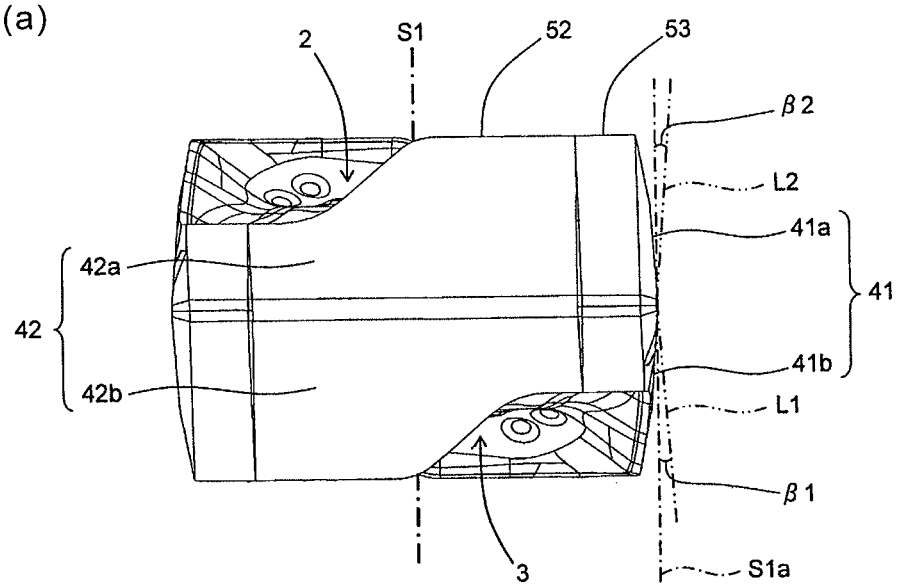
FIGS. 2(*a*) and 2(*b*) are respectively side views illustrating an embodiment obtained by partially modifying the cutting insert of FIG. 1, which respectively correspond to enlarged views of FIG. 1(*c*), and respectively illustrate modifications of the configuration of the first side surface of the cutting insert shown in FIG. 1, this being also true for FIGS. 5 and 12.
Figure 3:
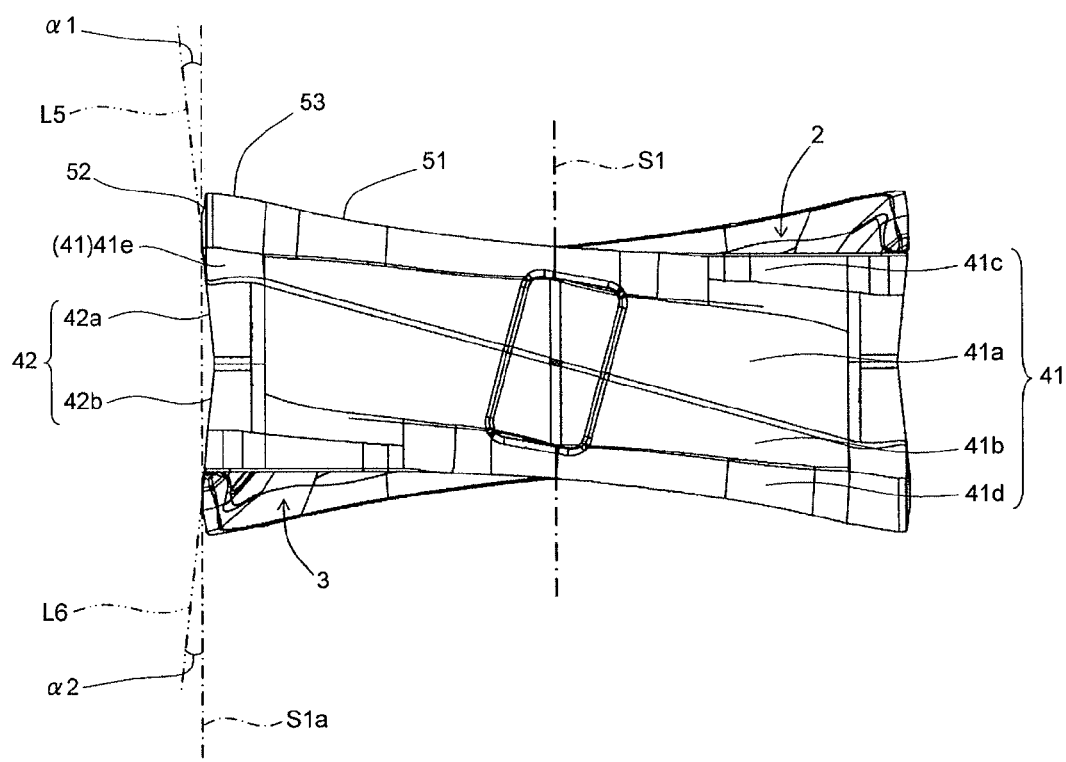
FIG. 3 is a side view of the cutting insert of FIG. 1, and is also an enlarged view of FIG. 1(*d*)

As shown in FIGS. 2(a) and 3, the first side surface 41 sequentially includes a first upper constraining surface 41a and a first lower constraining surface 41b in a direction from the upper surface 2 to the lower surface 3. The first upper constraining surface 41a is inclined outward at an inclination angle β1 on the basis of the central axis S1. The first lower constraining surface 41b is continuous with the first upper constraining surface 41a and is inclined inward at an inclination angle β2. When the cutting process is performed using the major cutting edge 51P located close to the third side surface 41P, the first upper constraining surface 41a is brought into contact with the holder 10, thereby functioning to fix the insert 1 to the holder 10, and vice versa.

Figure 2B:
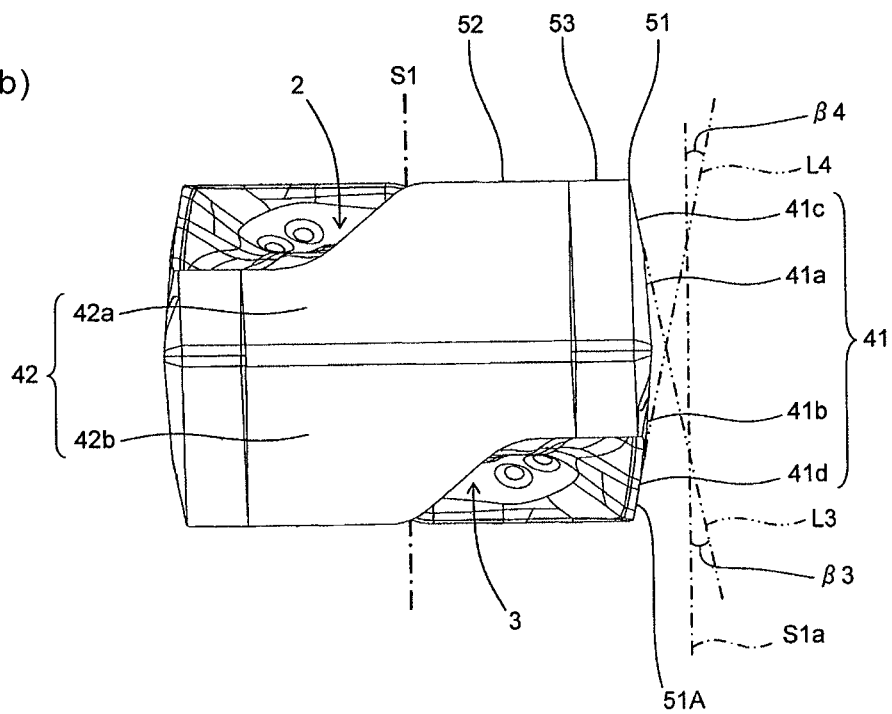

As shown in FIGS. 2(b) and 3, the first side surface 41 includes a first upper reinforcement surface 41c that is located between the major cutting edge 51 and the first upper constraining surface 41a, and has a portion inclined as going from the upper surface 2 to the lower surface 3 at an inclination angle β3 on the basis of the central axis S1. The inclination angle β3 of the first upper reinforcement surface 41c is larger than the inclination angle β1 of the first upper constraining surface 41a.

Similarly, the first side surface 41 includes a first lower reinforcement surface 41*d* that is located between the major cutting edge 51A close to the lower surface 3 and the first lower constraining surface 41*b*, and is inclined as going from the upper surface 2 to the lower surface 3 at an inclination angle $\beta 4$ on the basis of the central axis S1. The inclination angle $\beta 4$ of the first lower reinforcement surface 41*d* is larger than the inclination angle $\beta 2$ of the first lower constraining surface 41*b*.

The term "inclination angle $\beta 1$" denotes an angle formed by a plane S1*a* parallel to the central axis S1 and a virtual extension line L1 of the first upper constraining surface 41*a*. The term "inclination angle $\beta 2$" denotes an angle formed by the plane S1*a* and a virtual extension line L2 of the first lower constraining surface 41*b*. The term "inclination angle $\beta 3$" denotes an angle formed by the plane S1*a* and a virtual extension line L3 of the first upper reinforcement surface 41*c*. The term "inclination angle $\beta 4$" denotes an angle formed by the plane S1*a* and a virtual extension line L4 of the first lower reinforcement surface 41*d*. The individual inclination angles are indicated by an absolute value on the basis of the central axis S1.

The insert 1 of the present embodiment has a relationship that the inclination angle $\beta 1$ equals to the inclination angle $\beta 2$, and also has a relationship that the inclination angle $\beta 3$ equals to the inclination angle $\beta 4$. For example, the inclination angles $\beta 1$ and $\beta 2$ are respectively preferably set to 3° to 5°, and the inclination angles $\beta 3$ and $\beta 4$ are respectively preferably set to 4° to 7°. Each of these inclination angles may be changed as going away from the minor cutting edge 52.

Figure 4A:
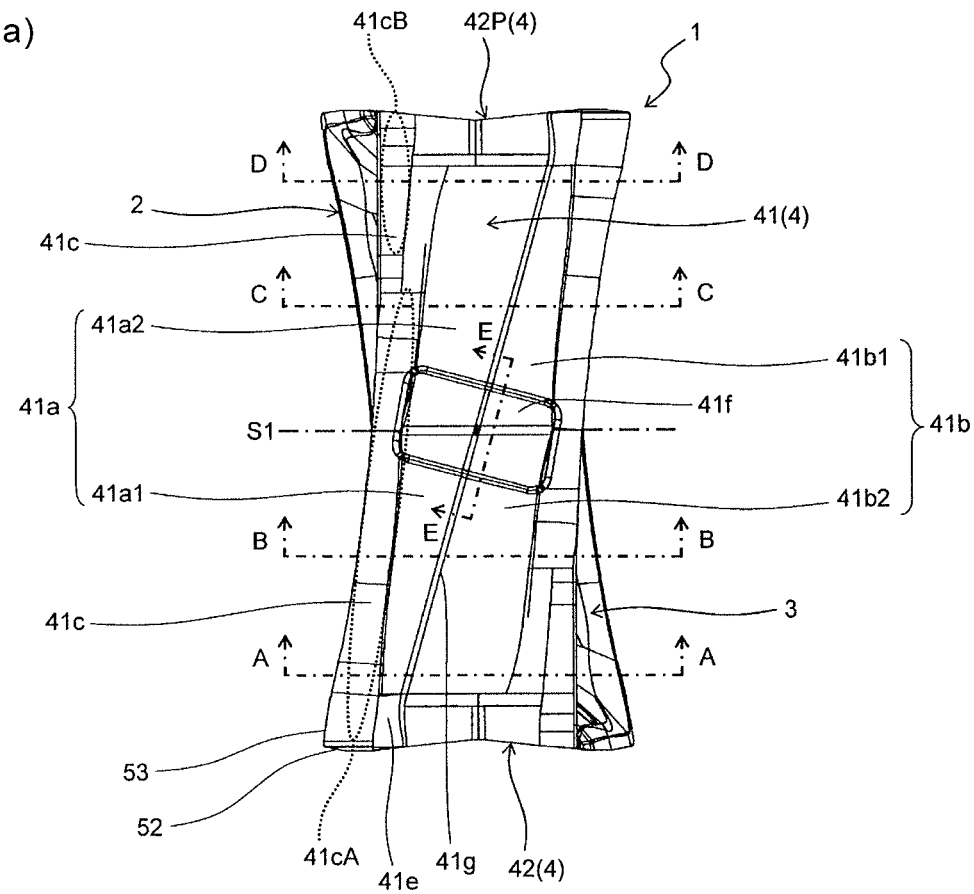
FIG. 4(*a*) is a side view of the cutting insert of FIG. 1, and is also an enlarged view of FIG. 1(*d*), and FIG. 4(*b*) is an enlarged cross-sectional view taken along the line E-E of FIG. 4(*a*)
Figure 4B:
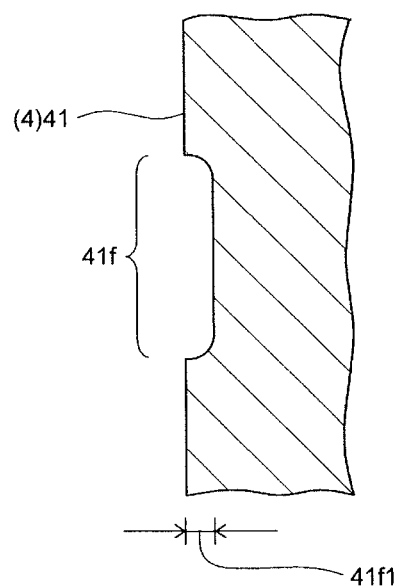
Figure 5A:
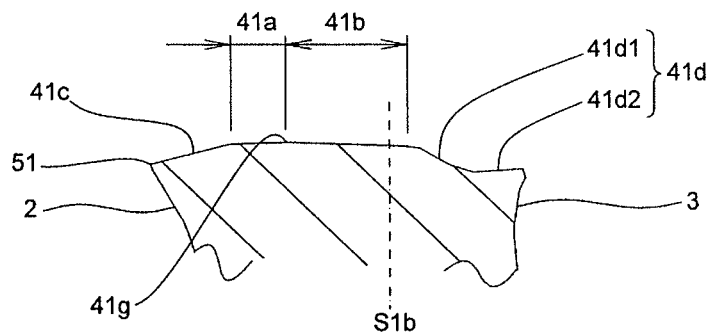
FIGS. 5(*a*) to 5(*d*) are respectively cross-sectional views illustrating an embodiment obtained by partially modifying the cutting insert of FIG. 1, specifically, FIG. 5(*a*) is the cross-sectional view taken along the line C-C of FIG. 4(*a*), FIG. 5(*b*) is the cross-sectional view taken along the line B-B of FIG. 4(*a*), FIG. 5(*c*) is the cross-sectional view taken along the line C-C of FIG. 4(*a*), and FIG. 5(*d*) is the cross-sectional view taken along the line D-D of FIG. 4(*a*), FIG. 6(*a*) is a plan view (top view) of the cutting insert of FIG. 1, FIG. 6(*b*) is a cross-sectional view taken along the line a-a of FIG. 6(*a*), FIG. 6(*c*) is a cross-sectional view taken along the line b-b of FIG. 6(*a*), and FIG. 6(*d*) is a cross-sectional view taken along the line c-c of FIG. 6(*a*)
Figure 5B:
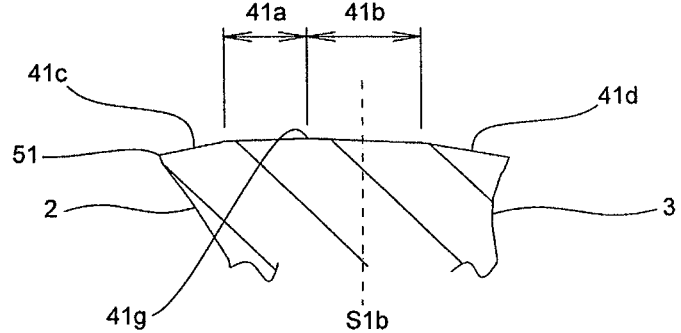
Figure 5C:
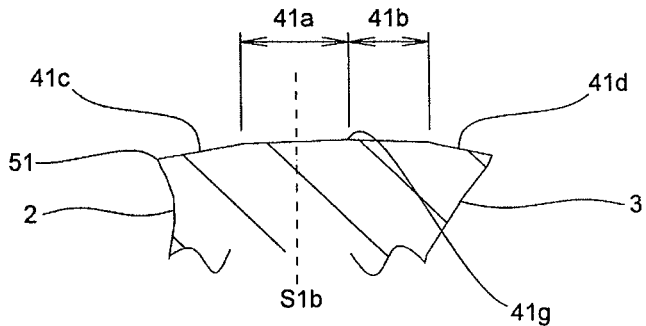
Figure 5D:
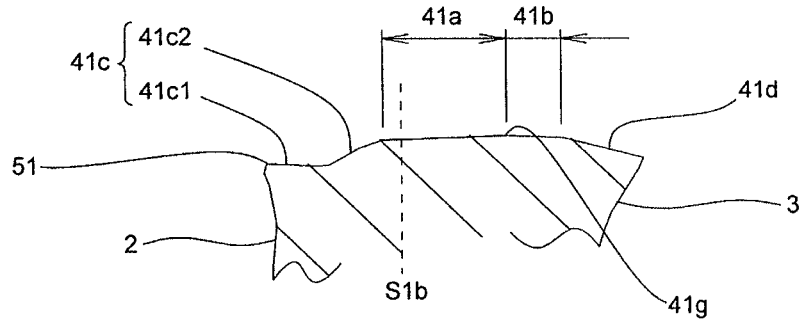

In the present embodiment, as shown in FIGS. 4 and 5, the first upper reinforcement surface 41*c* includes a first region 41*c*A close to the minor cutting edge 52 (corner cutting edge 53), and a second region 41*c*B spaced apart from the minor cutting edge 52 (corner cutting edge 53). The first region 41*c*A and the second region 41*c*B differ from each other in configuration. In FIG. 5, the straight line S1*b* is perpendicular to the central axis S1 and passes through the center in a thickness direction of the insert 1.

To be specific, the first upper reinforcement surface 41*c* is inclined outward in the first region 41*c*A as going from the upper surface 2 to the lower surface 3 as shown in FIGS. 5(*a*) and 5(*b*). More specifically, the first upper reinforcement surface 41*c* has a shape that bulges outward as going from the upper surface 2 to the lower surface 3. In the present embodiment, the region shown in FIG. 5(*c*) has a similar shape.

As shown in FIG. 5(*d*), in the second region 41*c*B, an upper region 41*c*1 of the first upper reinforcement surface 41*c*, which is continuous with the major cutting edge 51, is inclined inward with respect to the central axis S1 of the insert 1. A lower region 41*c*2 of the upper region 41*c*1, which is continuous with the lower surface 3, is inclined outward as going further toward the lower surface 3. More specifically, the lower region 41*c*2 has a shape that bulges outward as going further toward the lower surface 3.

Thus, the upper region 41*c*1 of the first upper reinforcement surface 41*c* is inclined inward with respect to the central axis S1 of the insert 1. Accordingly, when the holder 10 with the insert 1 attached thereto is rotated around a rotation axis S2 of the holder 10, a clearance between the upper region 41*c*1 and a wall surface 101 of the workpiece 100 can be ensured to effectively reduce damage to the wall surface 101 of the workpiece 100. As shown in FIG. 5(*a*), the same is true for the relationship between the upper region 41*d*1 and the lower region 41*d*2 of the first lower reinforcement surface 41*d*.

The first side surface 41 further includes a first flank surface 41*e*. The first flank surface 41*e* is located below the major cutting edge 51 and closer to the second side surface 42 than both of the first upper reinforcement surface 41*c* and the first upper constraining surface 41*a*, and is inclined outward as going from the upper surface 2 to the lower surface 3 at an inclination angle $\gamma$ on the basis of the central axis S1. The inclination angle $\gamma$ (not shown) of the first flank surface 41*e* is smaller than the inclination angle $\beta 3$ of the first upper reinforcement surface 41*c*. Owing to the first flank surface 41*e*, the contact with a portion of the workpiece 100 that becomes the wall surface 101 of the workpiece 100 during the cutting process can be reduced to improve machining accuracy and reduce damage to the insert 1. In the present embodiment, as shown in FIG. 3, the first flank surface 41*e* extends not only below the major cutting edge 51 as described above, but also below the corner cutting edge 53. Consequently, a similar effect is also attainable on the corner cutting edge 53.

In the insert 1 of the present embodiment, as shown in FIGS. 1(*d*) and 4(*a*), a boundary part 41*g* of the first upper constraining surface 41*a* and the first lower constraining surface 41*b* has a straight line shape and is inclined toward the lower surface 3 as going away from the minor cutting edge 52 with respect to a perpendicular line of the central axis S1 of the insert 1 in the side view. The boundary part 41*g* is located outermost of the first side surface 41. The boundary part 41*g* has a belt shape with a relatively large width, and has a curved surface shape protruding outward as going from one end to the other end in the width direction. This configuration ensures a relatively large area of the first upper constraining surface 41*a* and the first lower constraining surface 41*b*, and also ensures smooth loading of a material into a mold when molding the insert 1. A radius of curvature of a curved line is preferably set to, for example, 0.1 to 0.5 mm. In another embodiment, the boundary part 41*g* may have a curved line shape partially or over the full length thereof in the side view.

The first side surface 41 of the present embodiment includes portions (surfaces) 41*a*1 and 41*a*2 and portions (surfaces) 41*b*1 and 41*b*2, which are respectively obtained by dividing the first upper constraining surface 41*a* and the first lower constraining surface 41*b* into two portions by a concave part 41*f* located at an approximately middle part of the first side surface 41 as shown in FIGS. 1(*d*) and 4(*a*). That is, the first upper constraining surface 41*a* includes a first upper constraining portion 41*a*1 and a second upper constraining portion 41*a*2. The first lower constraining surface 41*b* includes a first lower constraining portion 41*b*1 and a second lower constraining portion 41*b*2. With this configuration, when the insert 1 is attached to the holder 10, the two divided surfaces 41*a*1 and 41*a*2 and the two divided surfaces 41*b*1 and 41*b*2 are independently contacted with the holder 10 with the concave part 41*f* interposed therebetween. Therefore, even when a slight misregistration occurs upon the attachment to the holder 10, a relatively larger contact area with the holder 10 can be ensured to improve the attachment stability to the holder 10 than the case of being contacted through a single surface.

Particularly in the present embodiment, the three surfaces (41*a*1, 41*a*2, and 42*a*), including the second upper constraining surface 42*a* (or the second lower constraining surface 42b) of the second side surface 42, can be brought into contact with the holder 10, thus exhibiting the excellent attachment stability.

The concave part 41f is preferably inclined toward the minor cutting edge 52 as going from the upper surface 2 to the lower surface 3 in the side view. This configuration allows the areas of the two divided constraining portions 41a1 and 41a2 (41b1 and 41b2) to approximate each other. Consequently, a cutting force applied mainly to the insert 1 during cutting of the workpiece 100 can be received by the two divided constraining portions 41a1 and 41a2 (41b1 and 41b2) in a well-balanced manner so as to improve the attachment stability. A depth 41f1 of the concave part 41f is preferably set to, for example, 0.3 to 0.15 mm.

As shown in FIG. 3, the second side surface 42 sequentially includes a second upper constraining surface 42a and a second lower constraining surface 42b in the direction from the upper surface 2 to the lower surface 3. The second upper constraining surface 42a is inclined inward at an inclination angle $\alpha 1$ on the basis of the central axis S1. The second lower constraining surface 42b is continuous with the second upper constraining surface 42a and is inclined outward at an inclination angle $\alpha 2$ on the basis of the central axis S1. The term "inclination angle $\alpha 1$" denotes an angle formed by the plane S1a parallel to the central axis S1 and a virtual extension line L5 of the second upper constraining surface 42a. The term "inclination angle $\alpha 2$" denotes an angle formed by the plane S1a and a virtual extension line L6 of the second lower constraining surface 42b.

The insert 1 of the present embodiment has a relationship that the inclination angle $\alpha 1$ equals to the inclination angle $\alpha 2$. For example, the inclination angles $\alpha 1$ and $\alpha 2$ are respectively preferably set to 4° to 8°. When the cutting process is performed using the minor cutting edge 52P located close to the fourth side surface 42P, the second lower constraining surface 42b of the second side surface 42 is brought into contact with the holder 10, thereby functioning to fix the insert 1 to the holder 10, and vice versa.

In the present embodiment, the second side surface 42 includes a second upper reinforcement surface 42c and a second lower reinforcement surface 42d as shown in FIGS. 1(c) and 1(d). The second upper reinforcement surface 42c is located between the minor cutting edge 52 and the second upper constraining surface 42a, and is approximately parallel to the central axis S1. The second lower reinforcement surface 42d is located between the major cutting edge 51A close to the lower surface 3 and the second lower constraining surface 42b, and is approximately parallel to the central axis S1.

That is, in the present embodiment, the second side surface 42 sequentially includes the second upper reinforcement surface 42c, the second upper constraining surface 42a, the second lower constraining surface 42b, and the second lower reinforcement surface 42d as going from the upper surface 2 to the lower surface 3. With this configuration, the second side surface 42 is capable of reducing the contact with the workpiece 100 during the cutting process owing to the second upper constraining surface 42a and the second lower constraining surface 42b. The second side surface 42 is also capable of exhibiting excellent cutting edge strength owing to the second upper reinforcement surface 42c and the second lower reinforcement surface 42d that are approximately parallel to the central axis S1.

In the present embodiment, the lengths of the second upper reinforcement surface 42c and the second lower reinforcement surface 42d in the thickness direction of the insert 1 are decreased as going away from the corresponding major cutting edge 51 (corner cutting edge 53) according to the configuration that the minor cutting edge 52 is inclined in the straight line shape as described above.

The insert 1 of the present embodiment having the foregoing configurations may be formed of a hard material, such as cemented carbide, ceramic, or cermet, or one obtained by coating any one of these base materials with a hard film of TiC, TiN, TiCN, or $Al_2O_3$ by means of PVD or CVD. PVD-coated cemented carbide is preferred from the viewpoint of chipping resistance and the stability of a coating layer.

<Cutting Tool>

A cutting tool according to an embodiment of the present invention is described below with reference to FIGS. 8 to 10.

Figure 9A:
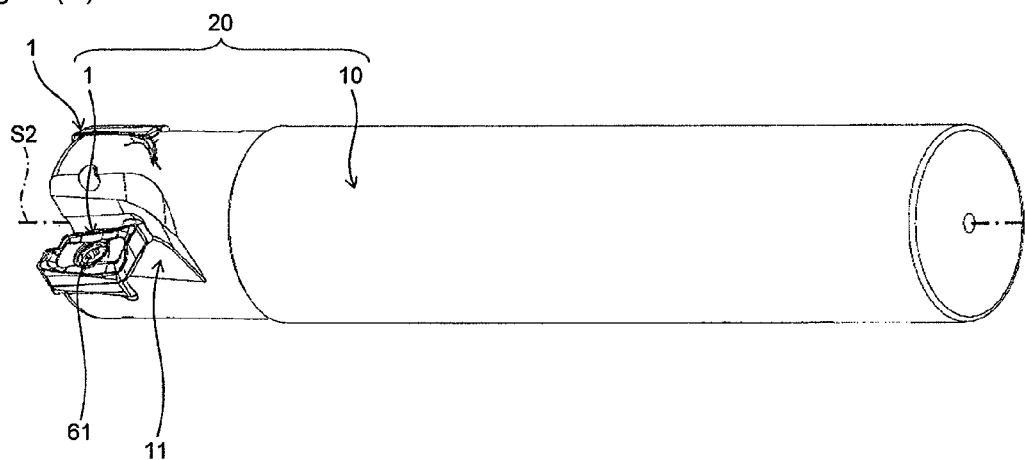
FIG. 9(a) is a perspective view of a cutting tool according to an embodiment of the present invention.
Figure 9B:
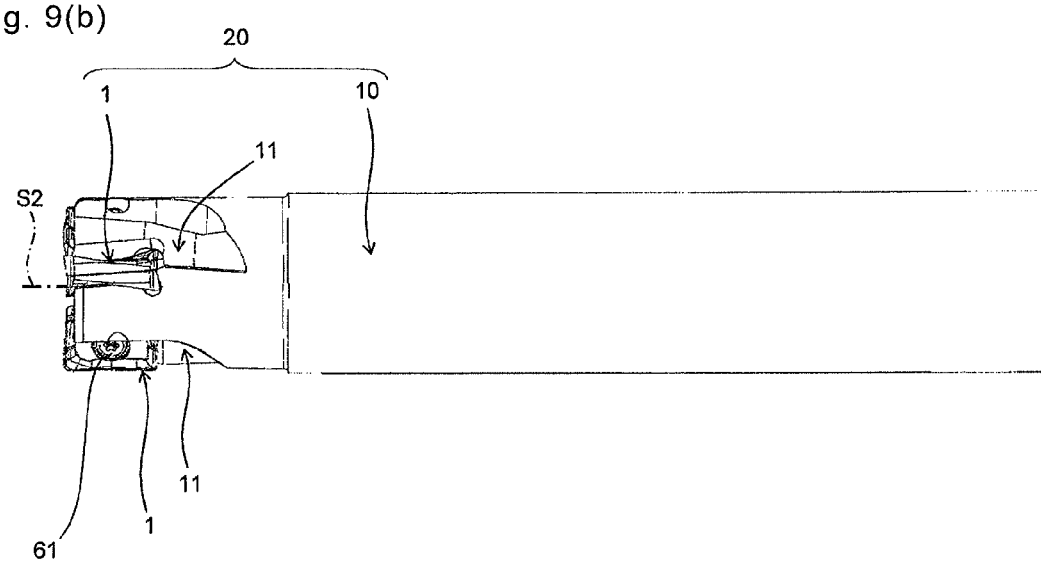
FIG. 9(b) is a side view thereof.

As shown in FIGS. 9 and 10, the cutting tool 20 of the present embodiment is configured to attach a plurality of inserts 1 described above to outer peripheral front end portions of the holder 10.

Figure 8A:
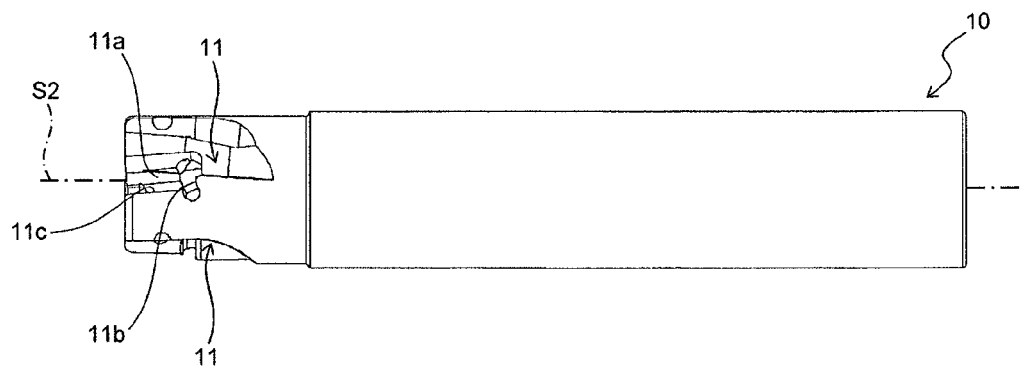
FIG. 8(a) is a side view of a holder configured to attach thereto the cutting insert according to the embodiment of the present invention.
Figure 8B:
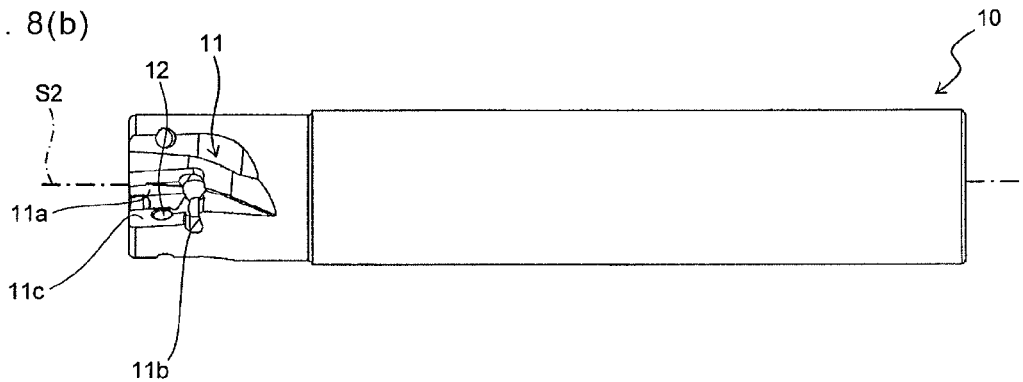
FIG. 8(b) is a side view of the holder taken from a different angle from that of FIG. 8(a), that is, the side view obtained by turning FIG. 8(a) by 90°, namely, the side view when the FIG. 8(a) is viewed from below.
Figure 8C:
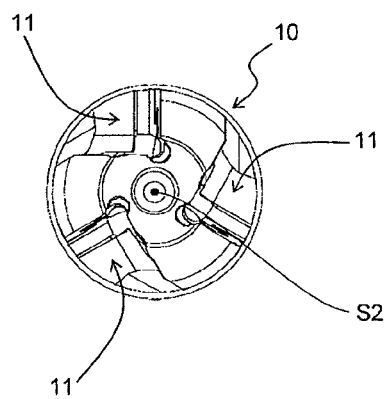
FIG. 8(c) is a front end view of the holder.

To be specific, as shown in FIG. 8, a plurality of insert pockets 11 are disposed at spaced intervals in a circumferential direction in the outer peripheral front end portions of the holder 10 of the present embodiment. As shown in FIG. 8(c), the insert pockets 11 are the portions obtained by cutting out the outer peripheral front end portions of the holder 10 in an approximately V shape in a front end view. A plurality of attachment surfaces of the insert pockets 11, which are formed by cutting out, function as attachment portions of the inserts 1. The inserts 1 are respectively attached to the insert pockets 11 one by one.

A method of attaching the inserts 1 includes, for example, inserting a clamp screw 61 into each of the through holes 6 of the inserts 1, and screwing a front end portion of the clamp screw 61 to a screw hole 12 formed in each of the attachment surfaces of the holder 10. Another method of attaching the inserts 1 includes, for example, a clamp structure.

Figure 10A:
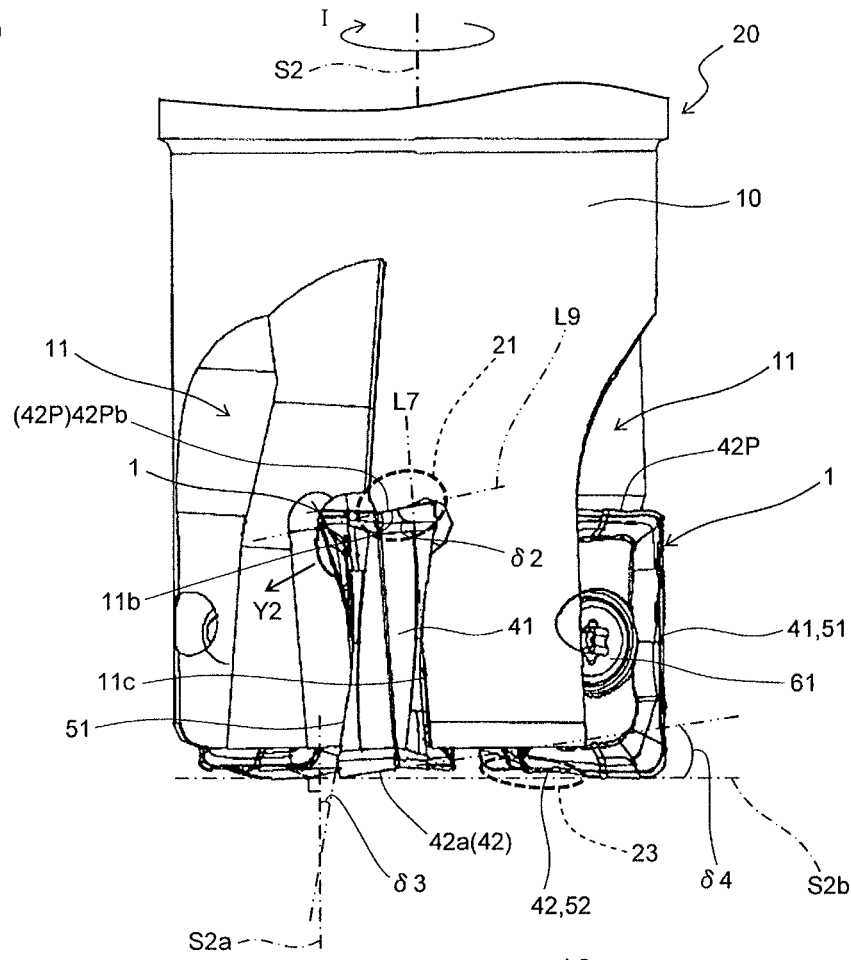
FIG. 10(a) is a partially enlarged view illustrating in enlarged dimension a front end part of the cutting tool of FIG. 9(b)
Figure 10B:
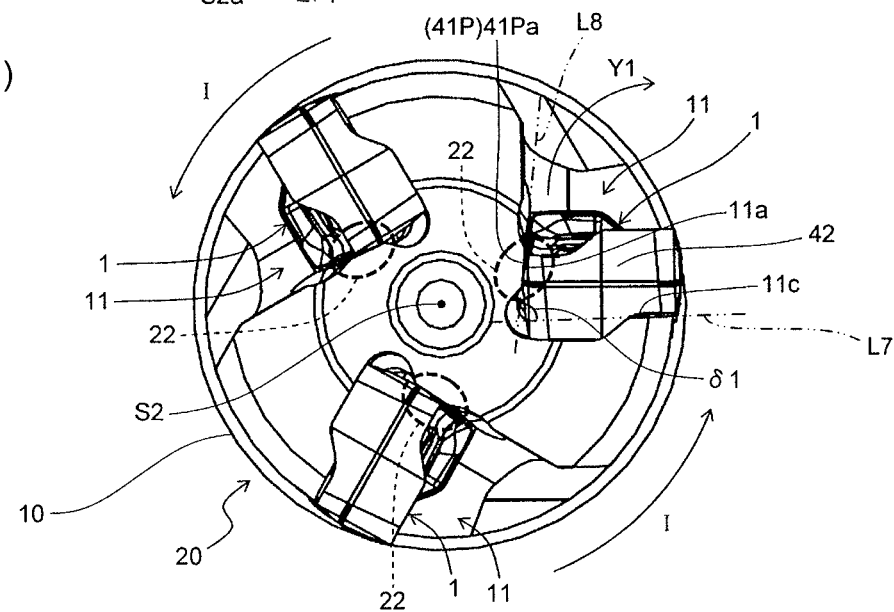
FIG. 10(b) is a front end view thereof.

As shown in FIGS. 8 and 10(b), the holder 10 (insert pockets) includes a seating surface 11c to be contacted with the lower surface 3 of the insert 1, and a first constraining surface 11a (contact surface) to be contacted with the first upper constraining surface 41a (third upper constraining surface 41Pa) of the insert 1. An angle δ1 formed by a virtual extension line L7 of the seating surface 11c and a virtual extension line L8 of the first constraining surface 11a is an acute angle.

As shown in FIGS. 8 and 10(a), the holder 10 (insert pockets) includes a second constraining surface lib (contact surface) to be contacted with the second lower constraining surface 42b (fourth lower constraining surface 42Pb) of the insert 1. An angle δ2 formed by the virtual extension line L7 of the seating surface 11c and a virtual extension line L9 of the second constraining surface 11b is an acute angle.

Each of the inserts 1 is attached to the holder 11 in a state that the upper surface 2 is oriented forward in a rotation direction indicated by arrow I of FIG. 10 so as to allow the major cutting edge 51 to project beyond the outer periphery of the holder 10. Then, the first side surface 41 and the second side surface 42 are located close to the outer periphery of the front end of the holder 10, and the cutting process for the workpiece 100 is performed using the major cutting edge 51 and the minor cutting edge 52.

The surface of the side surface 4 of the insert 1, which do not contribute to the cutting action, namely, the third side surface 41P and the fourth side surface 42P are respectively contacted with the contact surfaces of the holder 10. That is, the fourth lower constraining surface 42Pb of the fourth side surface 42P is contacted with the second constraining surface 11b of the holder 10 as shown by the region surrounded by a broken line 21 in FIG. 10(a). The third upper constraining surface 41Pa of the third side surface 41P is contacted with the first constraining surface 11a of the holder 10 as shown by the region surrounded by a broken line 22 in FIG. 10(b). Consequently, the insert 1 and the holder 10 are mutually constrained so that the insert 1 is attached to the holder 10.

Hence, according to the cutting tool 20 of the present embodiment, as shown in FIG. 10(b), relatively large cutting force exerted on the major cutting edge 51 close to the first side surface 41 during the cutting process acts as force (buoyant force) by which the third side surface 41P of the insert 1 is lifted from the holder 10 in an arrowed direction Y1 via the clamp screw 61 inserted into the through hole 6. However, with the configuration that the angle δ1 is the acute angle, the third upper constraining surface 41Pa of the third side surface 41P on which the buoyant force occurs can be pressed from above by the first constraining surface 11a of the holder 10, thereby effectively constraining the insert 1.

As shown in FIG. 10(a), relatively small cutting force exerted on the minor cutting edge 52 close to the second side surface 42 acts as force (buoyant force) by which the fourth side surface 42P of the insert 1 is lifted from the holder 10 in an arrowed direction Y2 via the clamp screw 61 inserted into the through hole 6. However, with the configuration that the angle δ2 is the acute angle, the fourth lower constraining surface 42Pb of the fourth side surface 42P on which the buoyant force occurs can be pressed from above by the second constraining surface 11b of the holder 10, thereby effectively constraining the insert 1. Thus, the cutting tool 20 of the present embodiment is capable of generating appropriate constraining force according to the position subjected to the cutting force and the magnitude of the cutting force, thereby improving the stability of constraint of the insert 1 and the holder 10.

Additionally, with the cutting tool 20 of the present embodiment, it is ensured to improve the degree of freedom for the attachment of the foregoing inserts 1 to the holder 10, and to obtain excellent operation advantage based thereon. That is, as shown in FIG. 10(a), the major cutting edge 51 is disposed so as to have a positive axial rake angle δ3. This configuration ensures reduction of cutting resistance. The second upper constraining surface 42a of the second side surface 42 is disposed so as to have a clearance angle δ4 of approximately 8° to 15°. This configuration ensures reduction of damage to the second upper constraining surface 42a, and also ensures improvement of surface roughness of the finished surface 102 of the workpiece 100.

The axial rake angle δ3 of the major cutting edge 51 preferably reaches approximately 8° to 15° at the end portion thereof close to the minor cutting edge 52, and is preferably decreased as going away from the minor cutting edge 52. The term "axial rake angle δ3" denotes an inclination angle with respect to a plane S2a parallel to the rotation axis S2 of the holder 10. The term "clearance angle δ4" denotes an inclination angle with respect to a plane S2b perpendicular to the rotation axis S2 of the holder 10.

In the present embodiment, the insert 1 is disposed so that the longitudinal direction thereof has an inclination of approximately 2° to 6° with respect to the rotation axis S2 of the holder 10 in the side view. Accordingly, the minor cutting edge 52 is disposed so as to have an inclination of approximately 0° to 1° with respect to the plane S2b perpendicular to the rotation axis S2 of the holder 10.

A non-cutting region of the intersecting part of the upper surface 2 and the second side surface 42, which is not substantially used as the minor cutting edge 52, namely, the region surrounded by a broken line 23 shown in FIG. 10(a), in other words, the region extending from a middle part of the intersecting part to the end portion thereof opposite the corner cutting edge 53 is preferably disposed so as to have an inclination of approximately 0° to 2° with respect to the plane S2b perpendicular to the rotation axis S2 of the holder 10. With this configuration, the non-cutting region is spaced apart from the finished surface 102 of the workpiece 100 during the cutting process, and hence the contact therebetween can be suppressed to reduce damage to the non-cutting region. That is, when the insert 1 is used by turning over the upper surface 2 and the lower surface 3, the non-cutting region is capable of appropriately exhibiting the function as the minor cutting edge 52.

The cutting process of the workpiece 100 using the major cutting edge 51 and the minor cutting edge 52 is performed by rotating the cutting tool 20 having the foregoing configurations in the arrowed I direction around the rotation axis S2 of the holder 10.

<Method of producing Machined Product>

A method of producing a machined product according to an embodiment of the present invention is described below with reference to FIG. 11.

Firstly, the cutting tool 20 with the plurality of inserts 1 attached to the holder 10 as described above is prepared before starting the cutting process of the workpiece 100. As shown in FIG. 11, the cutting tool 20 is disposed so that the rotation axis S2 of the holder 10 is approximately parallel to a surface of the workpiece 100 that is to become the wall surface 101 by being cut.

Figure 11A:
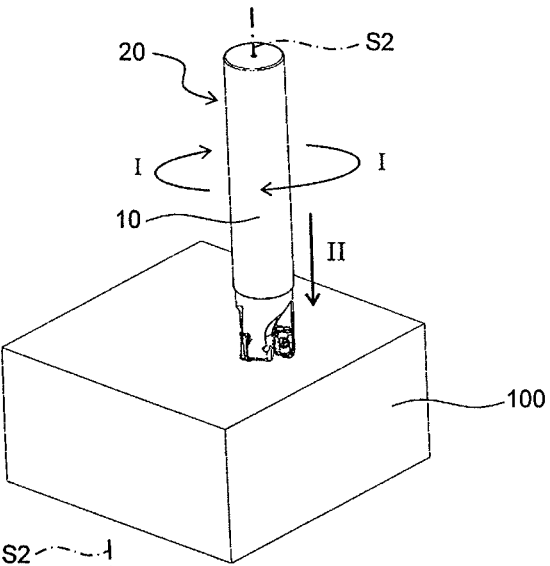
FIGS. 11(a) to 11(c) are respectively perspective views showing a method of producing a machined product according to an embodiment of the present invention in the process sequence thereof.

Subsequently, as shown in FIG. 11(a), the workpiece 100 is fixed to, for example, a bed for a milling machine (not shown), and the cutting tool 20 is moved in an arrowed direction II so as to set an appropriate depth of cut.

Figure 11B:
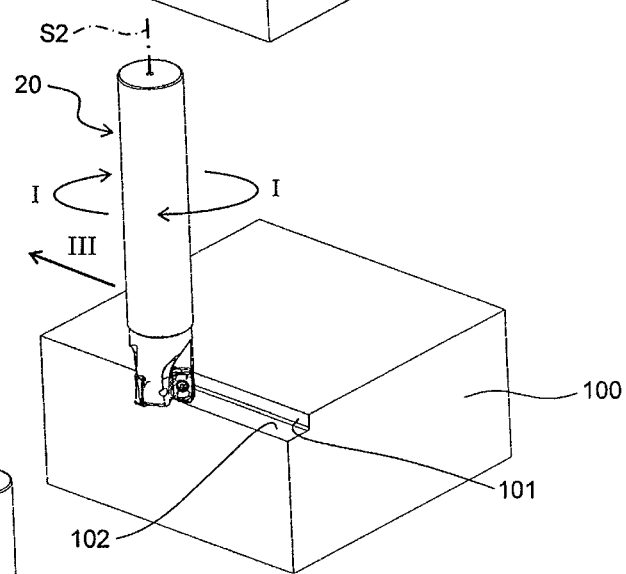

Subsequently, as shown in FIG. 11(b), the cutting tool 20 is fed (moved) in an arrowed direction III while rotating the cutting tool 20 around the arrowed direction I around the rotation axis S2 of the holder 10. Consequently, the major cutting edge 51 is brought into contact with a circular arc shaped part of the workpiece 100 located forward in the feed direction, thereby cutting a region according to the depth of cut. At this time, the plurality of inserts 1 sequentially enter a cutting region so as to perform cutting, so that circular arc lines (cutting marks) remain on the surface (bottom surface) of the workpiece 100. These circular arc shaped marks are then cut by the minor cutting edge 52, resulting in a smooth surface.

Figure 11C:
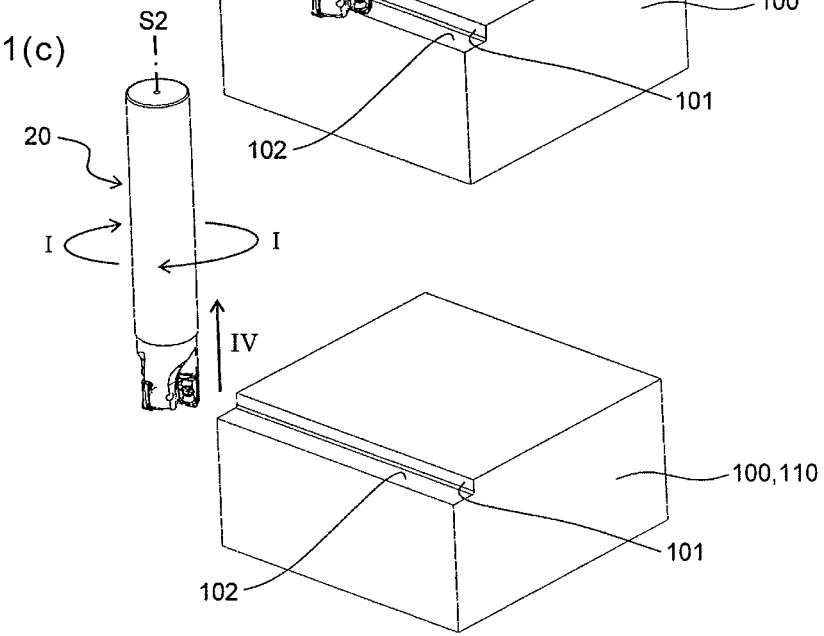

Subsequently, as shown in FIG. 11(c), the cutting tool 20 passes through the workpiece 100 and is then raised in an arrowed direction IV so as to separate the cutting tool 20 from the workpiece 100.

Thus, the machined product 110 having the wall surface 101 and the finished surface 102 is produced through the foregoing individual steps. That is, the method of producing the machined product according to the present embodiment includes the step of cutting in which the cutting tool 20 is rotated so as to bring the individual inserts 1 into contact with the workpiece 100, and the step of separating the cutting tool 20 from the workpiece 100. These steps are sequentially performed to produce the machined product 110.

When the cutting process is continuously performed, for example, it is required to repeat the steps shown in FIGS. 11(b) and 11(c) by bringing the cutting edge 5 of the cutting tool 20 into contact with the same portion or different portions of the workpiece 100, while keeping the rotation of the cutting tool 20.

When the cutting edge 5 being used is worn, the cutting process may be performed using the cutting edge 5 not yet being used by rotating the insert 1 about the central axis S1, or by turning over the upper surface 2 and the lower surface 3.

It is to be understood that the present invention is not limited to the foregoing embodiments but various changes and modifications can be made therein without departing from the spirit or scope of the present invention.

For example, the cutting tool 20 being rotated is moved with respect to the workpiece 100 in the foregoing embodiment. Alternatively, the cutting process may be performed by rotating the cutting tool 20 at a predetermined position, and by feeding the workpiece 100 with respect to the cutting tool 20. Further, the foregoing embodiment has illustrated the milling machine as a machine tool. Alternatively, the cutting process may be performed by bringing the cutting tool 20 not being rotated and the workpiece 100 being rotated into contact with each other, as in the case of a lathe.

The minor cutting edge 52 has the straight line shape in the top view in the foregoing embodiment. Alternatively, the minor cutting edge 52 may be formed of three straight line portions in the top view. Specifically, a first straight line shaped part in a middle region is located most outward of the insert 1, and second and third straight line shaped parts on both sides of the first straight line shaped part are respectively inclined inward as going away from the middle region. This configuration ensures a large clearance between the third straight line shaped part spaced apart from the major cutting edge 51 (corner cutting edge 53) on the upper surface 2 and the finished surface 102 of the workpiece 100 when the insert 1 is attached to the holder 10 in a state that the second straight line shaped part close to the major cutting edge 51 (corner cutting edge 53) is disposed along the finished surface 102 of the workpiece 100 and the upper surface 2 is oriented forward in the rotation direction. This configuration also ensures a large clearance between the second straight line shaped part of the minor cutting edge 52A close to the above-mentioned lower surface 3 configured correspondingly to the upper surface 2 and the finished surface 102 of the workpiece 100. Hence, the contact between the finished surface 102 and each of the second and third straight line shaped parts can be suppressed to enhance the surface accuracy of the finished surface 102 of the workpiece 100.

Instead of the configuration of the foregoing embodiment, the upper surface 2 may include a protruded surface that is located continuously with at least a part of the rake surface 8 and is inclined upward as going away from the major cutting edge 51. In this embodiment, a first end portion 8a of the rake surface 8 located away from the minor cutting edge 52 is preferably continuous with the flat surface 21 with the protruded surface interposed therebetween. A second end portion 8b of the rake surface 8 located close to the minor cutting edge 52 is preferably continuous with the flat surface 21. In another embodiment, a flat bottom portion may be disposed between the rake surface 8 and the protruded surface. In this embodiment, the portion corresponding to the foregoing rake surface 8 and the flat surface 21 are preferably continuous with each other without disposing a portion inclined upward, such as the foregoing protruded surface, in a region of the upper surface 2 located inside the minor cutting edge 52.

Figure 12:
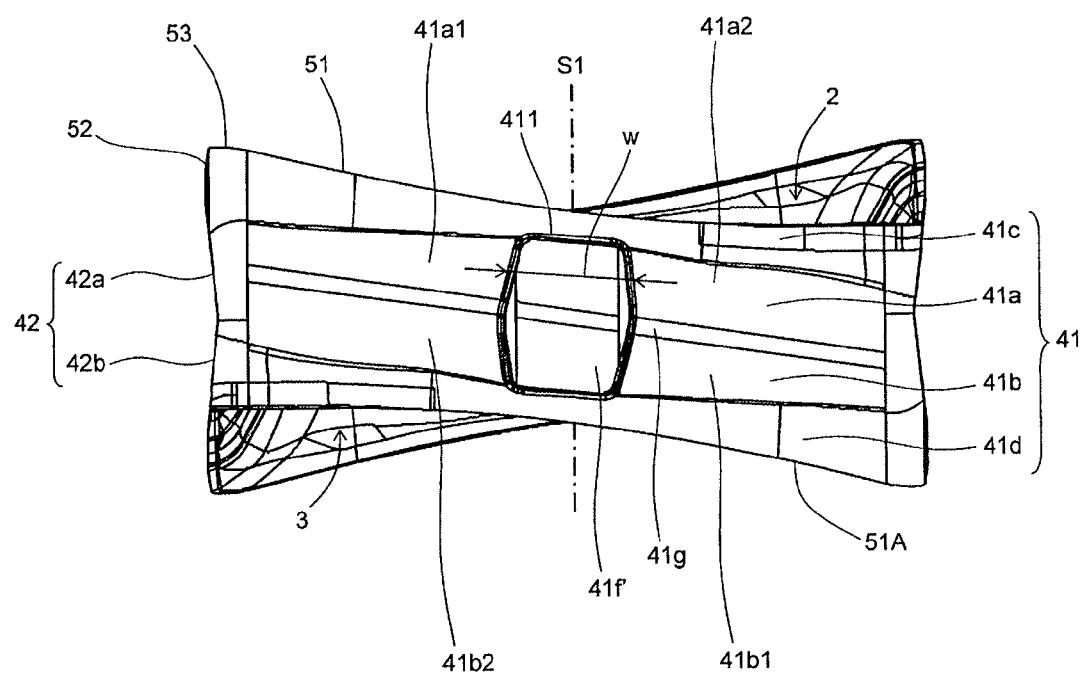
FIG. 12 is a side view which shows an embodiment obtained by partially modifying the cutting insert of FIG. 1, and which corresponds to an enlarged view of FIG. 1(d).

The concave part 41f has the approximately constant width perpendicular to the thickness direction of the insert 1 in the side view in the foregoing embodiment. In another embodiment, the concave part 41f may have the shape as shown in FIG. 12 in the side view. Specifically, as shown in FIG. 12, a concave part 41f' of this embodiment is located at an approximately middle part of the first side surface 41 in the side view, and has a width w perpendicular to the thickness direction of the insert 1. In this embodiment, short sides 411 of the concave part 41f' are approximately parallel to the major cutting edges 51 and 51A, and the width w is parallel to a straight line connecting both ends of each of the short sides 411. Further in this embodiment, the width w is narrow at positions close to the major cutting edges 51 and 51A, and is wide at positions away from the major cutting edges 51 and 51A. This configuration ensures the following effect. That is, when the size of the insert 1 is increased, the insert 1 may be considerably deformed by the force applied to the insert 1, for example, during the cutting process. Consequently, the constraining parts 41a1, 41a2, 41b1, and 41b2 and the holder 10 cannot be sufficiently contacted with each other, making it difficult to appropriately fix the insert 1 to the holder 10. However, with the configuration employing the concave part 41f', the constraining parts 41a1, 41a2, 41b1, and 41b2 respectively divided by the concave part 41f' can be relatively strongly brought into contact with the holder 10 even when the insert 1 is considerably deformed. The concave part 41f' is preferably narrowed at the positions close to the major cutting edges 51 and 51A. This configuration ensures retention of the strength of the major cutting edges 51 and 51A. The portions of the constraining parts 41a1, 41a2, 41b1, and 41b2, which are located on the circumference of the concave part 41f' and located close to the major cutting edges 51 and 51A, are particularly strongly brought into contact with the holder 10. It is therefore effective to make a modification to increase a contact length of the portions subjected to the particularly strong contact.

What is claimed is:

1. A cutting insert, comprising:
   a first surface;
   a second surface;
   a side surface connected to each of the first surface and the second surface and sequentially comprising a first side surface, a corner side surface and a second side surface; and
   an edge comprising,
      a first edge located at an intersecting part of the first surface and the first side surface, and
      a corner edge located at an intersecting part of the first surface and the corner side surface;
   wherein the first surface sequentially comprises a first inclined surface and a second inclined surface, the first inclined surface being located along the edge and inclined toward the second surface as going inward from the edge at a first angle on a basis of a perpendicular plane perpendicular to a central axis extending between the first surface and the second surface, the second inclined surface being located more inward than the first inclined surface and inclined toward the second surface at a second angle different from the first angle on the basis of the perpendicular plane,
   wherein the corner side surface comprises a concave portion.

2. The cutting insert according to claim 1, wherein the concave portion is apart from the corner cutting edge.

3. The cutting insert according to claim 1, wherein
the concave portion comprises a first portion and a second portion being located farther away from the corner edge than the first portion,
the first portion is inclined inward as going to away from the corner edge, and
the second portion is inclined outward as going to away from the first portion.

4. The cutting insert according to claim 1, wherein
the first side surface comprises a first surface portion along the first edge, and
the first surface portion is inclined outward on as going to away from the first cutting edge.

5. The cutting insert according to claim 4, wherein
the first surface portion comprises a first part and a second part being located farther away from the corner edge than the first part, and
an inclination angle of the first part is different from an inclination angle of the second part.

6. The cutting insert according to claim 5,
the inclination angle of the first part is larger than the inclination angle of the second part.

7. The cutting insert according to claim 4, wherein
the first side surface further comprises a second surface portion being located farther away from the first edge than the first surface portion, and
the second surface portion is configured to be attached to a holder.

8. A cutting insert, comprising:
a first surface;
a second surface;
a side surface connected to each of the first surface and the second surface and sequentially comprising a first side surface, a corner side surface, and a second side surface; and
an edge comprising,
 a first edge located at an intersecting part of the first surface and the first side surface, and
 a corner edge located at an intersecting part of the first surface and the corner side surface;
wherein the first surface sequentially comprises a first inclined surface and a second inclined surface, the first inclined surface being located along the edge and inclined toward the second surface as going inward from the edge at a first angle on a basis of a perpendicular plane perpendicular to a central axis extending between the first surface and the second surface, the second inclined surface being located more inward than the first inclined surface and inclined toward the second surface at a second angle different from the first angle on the basis of the perpendicular plane,
wherein the first inclined surface comprises a portion with a minimum of the first angle, and
wherein the portion is located closer to the second side surface than the first side surface in a top view.

9. The cutting insert according to claim 8, wherein
the first angle of the first inclined surface is smaller than the second angle of the second inclined surface.

10. The cutting insert according to claim 8, wherein
the first edge comprises a first region and a second region being located farther away from the corner edge than the first region, the first region being inclined toward the second surface as going to away from the corner edge at a third angle, the second region being inclined toward the second surface as going to away from the corner edge at a forth angle, and
the third angle is larger than the forth angle.

11. The cutting insert according to claim 8, wherein
the first edge is inclined toward the second surface as going to away from the corner edge at a fifth angle, and
the fifth angle of the first edge is decreased as going to away from the corner edge.

12. The cutting insert according to claim 8, wherein
in a top view, a total of a width of the first inclined surface and a width of the second inclined surface reaches a maximum at a region along the corner cutting edge.

13. The cutting insert according to claim 8, wherein
in a region along the first edge of the first surface, a total of a width of the first inclined surface and a width of the second inclined surface is decreased as going away from the corner edge, in a top view.

14. The cutting insert according to claim 8, wherein
in a region along the second edge of the first surface, a total of a width of the first inclined surface and a width of the second inclined surface is decreased as going away from the corner edge, in a top view.

15. The cutting insert according to claim 8, wherein
the first surface further comprises a flat surface located more inward than the second inclined surface.

16. The cutting insert according to claim 15, wherein
the flat surface is configured to be attached a holder.

17. The cutting insert according to claim 15, wherein
the flat surface is parallel to the perpendicular plane.

18. A cutting tool, comprising:
a cutting insert according to claim 1; and
a holder configured to attach the cutting insert to the holder.

19. A method of producing a machined product, comprising:
rotating a cutting tool according to claim 18;
bringing the edge of the cutting tool being rotated into contact with a workpiece; and
separating the cutting tool from the workpiece.

20. A cutting insert, comprising:
a first surface;
a second surface;
a side surface connected to each of the first surface and the second surface and sequentially comprising a first side surface, a corner side surface, and a second side surface; and
an edge comprising,
 a first edge located at an intersecting part of the first surface and the first side surface, and
 a corner edge located at an intersecting part of the first surface and the corner side surface;
wherein the first surface sequentially comprises a first inclined surface and a second inclined surface, the first inclined surface being located along the edge and inclined toward the second surface as going inward from the edge at a first angle on a basis of a perpendicular plane perpendicular to a central axis extending between the first surface and the second surface, the second inclined surface being located more inward than the first inclined surface and inclined toward the second surface at a second angle different from the first angle on the basis of the perpendicular plane,
wherein the first edge is inclined toward the second surface as going to away from the corner edge at a fifth angle, and
wherein the fifth angle of the first edge is decreased as going to away from the corner edge.

* * * * *